ANTIFERROMAGNETIC PARAMETRIC AMPLIFIER

Filed Nov. 14, 1962 3 Sheets-Sheet 1

June 28, 1966 R. A. MOORE 3,258,703

ANTIFERROMAGNETIC PARAMETRIC AMPLIFIER

Filed Nov. 14, 1962 3 Sheets-Sheet 3

United States Patent Office 3,258,703

Patented June 28, 1966

3,258,703

ANTIFERROMAGNETIC PARAMETRIC AMPLIFIER

Robert A. Moore, Severna Park, Md., assignor to Westinghouse Electric Corporation, Pittsburgh, Pa., a corporation of Pennsylvania Filed Nov. 14, 1962, Ser. No. 237,509
10 Claims. (Cl. 330—4.8)

This invention relates to solid state microwave signal translation devices and more particularly to parametric amplifiers which make use of precession induced in the spin systems of materials exhibiting properties under certain conditions which are akin to what is called "gyromagnetic" in the prior art.

More specifically, the invention is directed to microwave amplifiers especially adapted for amplifying signals whose wavelengths are of the order of millimeters or fractions thereof. The present amplifier utilizes materials having large internal anisotropy and exchange fields, an example of which are antiferromagnetic materials. Antiferromagnetic materials are distinguished by the existence of two, equal in magnitude but oppositely directed, interpenetrating magnetic moment systems such that there is no net external magnetic moment. In the presence of an externally applied magnetic field two oppositely rotating circularly polarized resonances exist. These resonances under these conditions are very similar to properties of certain ferromagnetic materials called "gyromagnetic."

The resonant frequencies depend upon the anisotropy and exchange fields and differ by an amount corresponding to the applied field as will be shown from the subsequent description.

The invention resides in the utilization of the natural resonances of these special materials, frequently referred to as exchange resonances, but which do not correspond to the gyromagnetic motion of a net external moment. This distinguishes the present invention from prior art devices which utilize the resonances corresponding to the gyromagnetic motion dependent upon the net external magnetic field. Therefore, a primary object of this invention is to greatly reduce the required external magnetic biasing field to achieve resonance for parametric amplification of very high frequency waves.

A further object is to provide a novel and improved parametric amplifier using materials which have two natural uniform precessional mode resonances which make possible efficient coupling with simple external radio frequency circuitry.

Another important object of the invention is to provide an amplifier of the type described which may be readily tuned by varying only the magnitude of the externally applied magnetic field.

Accordingly, a general object is to provide a novel and improved parametric amplifier which is capable of being operated at millimeter and submillimeter wave frequencies and which will have a low noise factor.

The novel features that are considered characteristic of this invention are set forth with particularity in the appended claims. The invention itself, however, both as to its organization and method of operation as well as additional objects and advantages will best be understood from the following description when read in connection with the accompanying drawings, in which:

Figure 16:
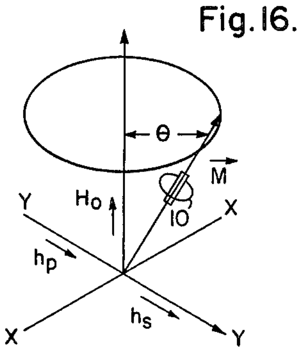
Figure 17:
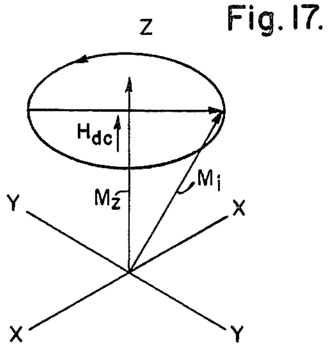

FIG. 16 graphically illustrates the interaction of the pump and transverse signal fields on the precession of the magnetization vector of the electrons of ferromagnetic material; and FIG. 17 is a graphical illustration of the actual mechanism of energy transfer from the pump frequency source to the signal to be amplified in a system in accordance with the present invention.

It has long been known that if a non-linear reactance is excited by a signal, usually called the pump frequency, there will be the effect of a transfer of energy to a lower excitation or signal frequency and to the difference or idler frequency between the pump and signal frequencies if connected to circuitry appropriate for coupling to interacting signals at the nonlinear reactance. Resonant circuits of various forms are frequently found useful in optimally matching the interacting signals at the nonlinear reactance.

Figure 15:
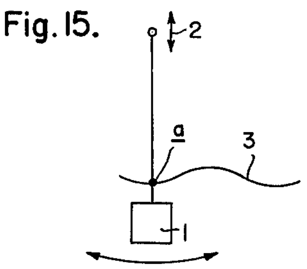
FIG. 15 is a representation of a pendulum mechanical analogy to a parametric amplifier and illustrates the basic parametric interactions.

Parametric systems involving many different types of nonlinear elements have been demonstrated. For example, a commonly used illustration of the basic parametric interaction is the parametrically excited pendulum as illustrated in FIG. 15. In this system, the pendulum may be pumped in the vertical direction indicated by the double pointed arrow 2. If the pendulum is simultaneously excited in its natural mode in a phase appropriate to the pumping, the amplitude will be greater than if the pumping were not present. Superimposed upon the analog diagram of the pendulum in FIG. 15 is a graph illustrating the vertical component of oscillation of point *a*, curve 3 representing the vertical oscillation as a function of time for one complete horizontal oscillation of the pendulum. Sustained oscillation will result if the pump excitation is sufficiently great to completely overcome the damping in the signal mode. The pendulum amplifier as illustrated is a degenerate amplifier, i.e., the signal and idler frequencies are coincident. A non-degenerate mechanical parametric amplifier can be constructed by suitably connecting two pendulums.

It is well known that the variable capacity diode can be used as the nonlinear elements in parametric interaction systems. Parametric amplifiers are constructed by appropriately coupling suitable resonant circuits for coupling the parametrically interacting signals at the nonlinear capacity. These amplifiers are made degenerate, usually by the use of a single resonant circuit at one half the frequency of the pump excitation, or made non-degenerate by the use of two resonant circuits, suitably coupled, the sum of the frequencies of the resonant circuits being equal to the pump frequency. Various improvements, such as amplification at a signal frequency higher than the pump frequency and broad banding, have been achieved by use of more than two resonant circuits.

Material generally known as ferrites, garnets, which are ferromagnetic, have been used to provide the non-linear coupling in parametric amplification. Ferromagnetic materials are characterized by a net unpaired spin or magnetic moment. This net unpaired spin responds gyromagnetically so that these materials are referred to as "gyromagnetic."

Representative of these materials is the class of materials which are magnetically polarized and have unpaired spin systems involving portions of the atom thereof, which spin systems are capable of being aligned by an external magnetic polarizing field and which exhibit a significant precessional motion of the externally aligned magnetic moment.

These materials are characterized by a gyromagnetic resonance which obeys the equation $$\dot{\vec{M}}=\gamma\left(\vec{M}\times\vec{H}\right)+\frac{\alpha}{M}\left(\vec{M}\times\dot{\vec{M}}\right) \quad (1)$$

where M is the D.C. saturation magnetization of the material, H is total internal field and $\alpha$ is the loss parameter with the resonant frequency $$\omega_r=\gamma\sqrt{[H_0+4\pi M(N_x-N_z)][H_0+4M(N_y-N_z]} \quad (2)$$

where $H_0$ and $4\pi M$ are the applied magnetic field and magnetic moment, respectively, the $N_x$, $N_y$ and $N_z$ are the normalized demagnetizing factors. This mode is frequently called the uniform precessional or "Kittel" resonance. This precessional resonance is illustrated in FIG. 16.

It is well known that other nonuniform resonant modes can be indirect in gyromagnetic material. These nonuniform modes are referred to variously as "higher order modes," magnetostatic or "Walker Modes." These modes are characterized by a space varying or a nonuniform magnetic moment throughout the medium. The nonuniform modes can be excited in most gyromagnetic material and their resonant frequencies can be varied by selecting the appropriate magnitude of biasing field.

Previous ferromagnetic amplifiers have utilized the nonlinear response of ferromagnetic type material just described. These amplifiers have variously used metallic cavity resonant circuits, and resonances supported by the magnetic mode, uniform precessional and magnetostatic modes of the material. Among the most significant contributions in this field are the work of H. Suhl, described in his article entitled "Theory of Ferromagnetic Microwave Amplifiers," Journal of Applied Physics, vol. 28, November 1957, pages 1225 to 1236, and M. T. Weiss, described in his article in the Physical Review, July 1, 1959, page 317, who produced microwave oscillation and amplification by the use of gyromagnetic material in a region of the network common to three signals. Since their work, various forms or modes of operation have been developed to find improved characteristics of operation. Among these improved characteristics would be included lower pump power, low noises and continuous operation.

One of these forms or modes of operation include the parallel pumped mode after the work of Poole, Tein and Weiss (Patent No. 3,044,021). In this mode of operation, the pumping signal is parallel to the D.C. magnetic biasing field. In this respect, the pump signal is not coupled to the oscillating modes in the absence of a transverse exciting field. Thus, the magnetic absorption of the pump power is greatly reduced.

It is well known that the density of the magnetic field required to achieve resonance suitable to support the parametric process in the usual magnetically polarized "gyromagnetic" materials, such as ordinary ferrites, is shown in Equation 2, approximately proportional to the required resonant frequency. Though the resonant frequencies of the magnetostatic mode spectrum deviates from this value, their frequencies are restricted to a band above this uniform precessional mode resonance. The upper and lower limits of this band as described by Walker, are given, respectively as $$f_1=\sqrt{(\omega_H-N_Z\omega_M)(\omega_H-N_Z\omega_M+\omega_M)}$$

and $f_2=\omega_H-N_Z\omega_M$ where $\omega_H$ is the frequency due to the saturation magnetization of the material. Thus by the use of the gyromagnetic motions of an externally exhibited magnetic moment it is impossible to achieve resonance much higher than indicated by Equation 2.

The previous discussion of operation of magnetically polarizable gyromagnetic devices relates to those known in the prior art. It is to be noted that the single precessing electron symbolized at 10 in FIG. 16 is intended as being representative of the mass action of all of the electrons affected by the single uniform precessional mode of ordinary ferromagnetic materials having the gyromagnetic properites. The radian frequency of precession, $\omega_0$ or Laramour frequency with gyromagnetic materials having no internal fields is $$\omega_0=\gamma H_0 \quad (3)$$

where $$\gamma=\frac{\text{magnetic moment}}{\text{angular momentum}} \quad (4)$$

and $H_0$ is the external magnetic biasing field. $H_0$ must be very intense for millimeter and submillimeter wavelengths. Symbols with zero subscripts are used herein to refer to properties and parameters of ordinary ferrite materials having gyromagnetic characteristics as the term gyromagnetic is defined in the prior art to distinguish from similar properties and parameters applying to materials according to the present invention having two internal fields and no net external field. The point of distinction between these prior devices and the present invention resides in the use of magnetic material, which cannot be externally polarized and has two uniform precessional resonances, the frequencies of which are substantially dependent upon the internal fields but can be varied by applied external magnetic fields.

The prior art devices are not particularly adapted to higher millimeter wave frequencies because in order to develop the high resonant frequencies, it is necessary to have a very high density externally applied magnetic field. In most of the familiar ferrite microwave components, they have been scaled down for millimeter devices, but it is not possible to scale down the means for applying the biasing magnetic field. As a matter of fact, it is necessary to increase the size of the means for producing the magnetic field.

In accordance with the present invention the very high magnetic fields required for amplification of millimeter and submillimeter frequencies in solid state amplifiers using ordinary ferrite materials can be greatly reduced by the use of antiferromagnetic material as the nonlinear element in parametric amplifiers. Antiferromagnetic material is characterized by the presence of two interrelated systems of magnetic moments. Each system of magnetic moments consists of atoms with unpaired electrons. Important characteristics of the antiferromagnetic material are the presence of strong anisotropy and exchange fields which maintain the direction and the antiparallel nature of the magnetic moments thus giving a net zero external moment. One of the unique characteristics of antiferromagnetic materials is the almost complete absence of polarizability in the presence of an external magnetic field.

One of the important characteristics of antiferromagnetic materials is the presence of exchange resonances at high microwave and millimeter frequencies. In antiferromagnetic materials, two uniform modes exist. In the absence of an external magnetizing field, these resonances are degenerate, that is, they are equal at the frequency characterized by $H_c$ indicated in FIG. 2, equal to the critical field. This is the field which if applied normal to the direction normal to the external magnetic moment, will result in the shift of both magnetic moment systems to that direction.

In an antiferromagnetic material, if a component of magnetic field is applied parallel to the natural orientation of the magnetic moment, the frequencies are no longer degenerate—one increases and the other decreases. The separation in frequency is approximately equal to 2 times the component of the applied magnetic field parallel to the material orientation of the magnetic moment as indicated in FIGS. 1 and 2.

In accordance with the present invention, antiferromagnetic materials are used for the nonlinear coupling means. The very large exchange and anisotropy fields result, for the different materials, in natural uniform resonances at a number of millimeter and submillimeter frequencies.

Figure 1:
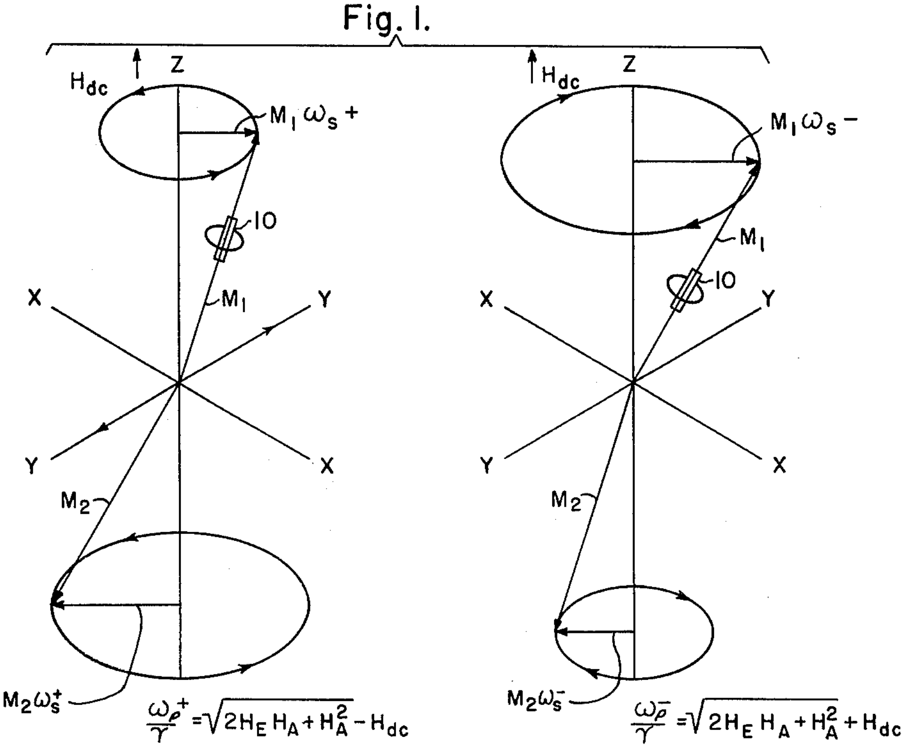
FIGURE 1 is a schematic representation illustrating the two uniform natural magnetostatic resonant modes of the gyroscopic precession of a bound electron in an antiferromagnetic material.
Figures 2, 3:
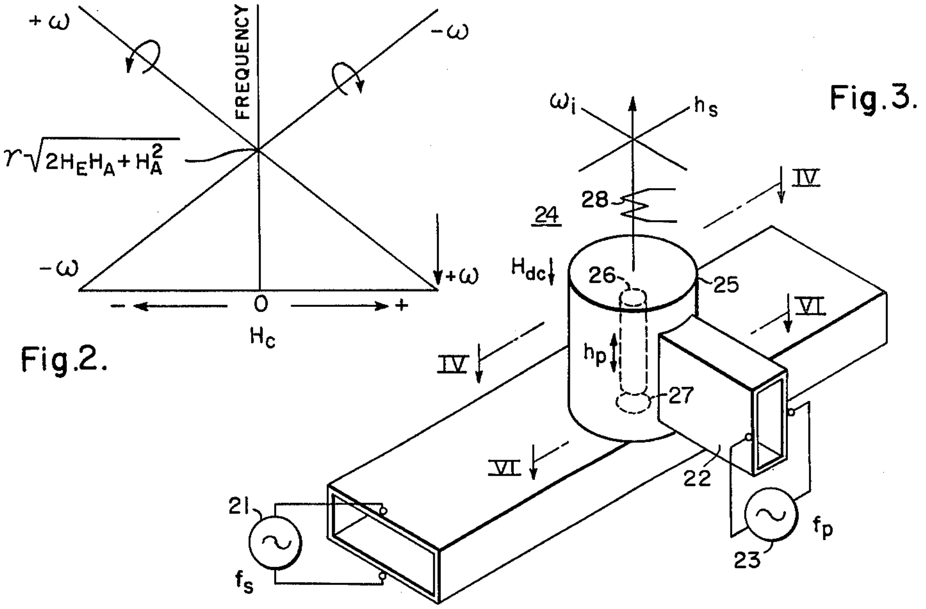
FIG. 2 is a graphical representation of the resonant frequencies as a function of the applied magnetic biasing field for the two natural uniform antiferromagnetic precessional modes.
FIG. 3 is an isometric view of a signal translation system including a solid state parametric amplifier in accordance with the present invention.

The two sets of interpenetrating oppositely directed magnetic moments of antiferromagnetic material is illustrated in FIG. 1 which should be contrasted with FIG. 16 in order to assess the point of difference between the prior art and the present invention. The graph of FIG. 2 represents the relation between the resonant frequencies of these uniform natural resonances as a function of the external or applied magnetic fields. It should be mentioned here that for temperature at zero degrees Kelvin, the magnitudes of the magnetization vectors $M_1$ and $M_2$ are substantially equal.

The high internal field in the antiferromagnetic materials produces degenerate natural resonances at millimeter wave frequencies. If, in accordance with the present invention, a D.C. magnetic biasing field is applied with a component parallel to the unperturbed direction of the magnetic moments, the degeneracy is removed and the two uniform precessional mode resonances in the opposite directions of circular polarization will appear. In accordance with the present invention, one of these uniform precessional modes is utilized to support the signal field while the other is used to support the idler fields. This condition lends itself very readily to the condition in parametric amplifiers where the pump frequency should be equal to the sum of the signaling and the idler frequencies. By making the pump frequency two times the frequency at the point where the two frequency curves in FIG. 2 intersect, it will be readily apparent that the condition above stated would be true for the application of substantial D.C. field in many materials. The pump field can be supported on one of the $TE_{omn}$ modes of the cavity. The signal and idler fields can be coupled with the oppositely rotating polarized $TE_{11n}$ modes of the cavity.

The dynamic response can be expressed in terms of two equal equations for a two lateral structure. The response of each magnetic moment system is then obtained by solving the two equations simultaneously. For temperatures very close to 0° K., the resonant condition becomes $$\omega_p = \omega_c \pm \omega_{Hdc} \quad (5)$$

where $\omega_p$ is the resonant frequency of one mode of the material, $$\omega_c = \gamma\sqrt{2H_E H_A + H_A^2} \quad (6)$$

$\omega_c$ is the frequency due to the internal critical field $H_c$ and $\omega_{Hdc}$ is the frequency due to applied field. Then Equation 5 becomes $$\omega_p = \gamma(\sqrt{2H_E H_A + H_A^2} \pm H_{dc}) \quad (7)$$

where $H_E$ is the internal exchange field, $H_A$ is the internal anisotropy field, and $H_{dc}$ is the applied external biasing field.

Because of the high frequency natural resonances existing by reason of the high internal exchange and anisotropy field of antiferromagnetic materials the external magnetic biasing field $H_{dc}$ required for the high frequencies in systems using antiferromagnetic materials need be only of sufficient intensity as to remove degeneracy. Additional external biasing field-may be applied to provide tuning. The use of uniform distribution modes will frequently substantially simplify coupling to the medium and will render practicable configurations which would otherwise not be feasible.

The present invention provides an improved microwave signal translation system in which a nonlinear parametric coupling unit includes an element of material, having high internal fields providing natural uniform magnetostatic mode resonances which are made nondegenerate by the application of an external magnetic biasing field, operatively associated in a microwave structure which is resonant at the pump frequency the signal frequency and at an idler frequency under conditions where the relation between the frequencies is $$\omega_p = \omega_i + \omega_s \quad (8)$$

where $\omega_p$, $\omega_i$ and $\omega_s$ represents the angular velocity of rotation of the pump, idler and signal field vectors, respeceively. This construction accomplishes two improved results (a) requiring lower field densities and (b) facilitates coupling of the pump and signal to external circuitry.

This resonane microwave structure plus the special antiferromagnetic material, when properly biased by an external magnetic biasing field constitutes the coupling unit between a section of microwave guide which is a part of a signal translation system in which the signal to be amplified is propagated, and a source of local oscillation or pump frequeicy. The amplifier portion of the system then comprises two intersecting resonators proportioned to be resonant at different, though related, frequencies the fields of the frequencies being so oriented that their respective magnetic fields are mutually perpendicular to each other in a common region of the cavity shared by both of said resonators.

The pointed difference between the prior art and the present invention is illustrated in FIG. 1 where the magnetization vectors $M_1$ and $M_2$ corresponding, respectively, to the two interpenetrating sublattices of the parametric ions of the antiferromagnetic material are oppositely directed internally of the material when no external fields are acting. These vectors $M_1$ and $M_2$ are substantially of equal amplitudes at zero degrees Kelvin. From the molecular field point of view, each sublattice can be considered to be acted upon by two molecular magnetic fields, one the exchange field $H_E$ and the other the anisotropy $H_A$, both previously mentioned. It is the exchange field which essentially causes the magnetic moments $M_1$ and $M_2$ to line up oppositely.

The anisotropy field $H_A$ essentially determines the direction in the crystal along which the alignment of the individual electron with respect to the field takes place. Its origin can be either dipolar coupling or crystalline fields. For the simple case of uniaxial crystals for small deviations of the sublattice magnetization from equilibrium, the anisotropy fields are directed along the equalibrium positions of $M_1$ and $M_2$. The order of magnitude of the anisotropy fields $H_A$ may vary from several hundred to tens of thousands of gauss. The mathematical expression for the resonant frequencies has been previously mentioned.

It should be noted here that the critical field $H_C$ is the density of field for which it is energetically more favorable for the sublattices to line up perpendicular to the external magnetic biasing field than to remain parallel. This is the phenomena of the "spin flip" which occurs at the instant that the field reaches the critical value $H_C$. Thus it will be seen that an antiferromagnetic material then behaves as if it were biased with the critical field $H_C$ and any modulation of the biasing field above or below the critical field causes the magnetization vectors to precess clockwise or counterclockwise depending upon whether or not the resonant frequency is below or above the frequency corresponding to the critical field $H_C$. This is illustrated in the two conditions symbolised in FIG. 1.

An embodiment chosen for the purpose of illustrating the present invention comprises an element in the form of a rod of material 26, having the characteristic of two natural uniform resonant modes as outline, arranged in a microwave structure for longitudinally pumped parametric amplification, as shown in FIG. 3. This figure illustrates a suitable electromagnetic wave structure for coupling electromagnetic wave energy into and out of the resonant modes of the antiferromagnetic rod.

To this end, a rectangular waveguide section 20, adapted to propagate microwave energy in the dominant $TE_{01}$ mode, is provided which constitutes a portion of a signal translation system for microwaves. For convenience, it may be considered that the signal input to be amplified is generated by a signal modulated source of microwave energy, represented by the generator 21, which is connected to supply the microwave energy to the left-hand end of section 20. The output end of the microwave guide section is constituted by the right-hand end of this section. Another section of waveguide 22, similar to section 20, is adapted to receive and transmit a local oscillator or pump frequency signal supplied by a suitable pump generator 23. The signal waveguide section 20 and the pump frequency waveguide 22 are coupled together through a coupling syste mwhich includes a circular cylindrical resonant microwave cavity 25 and the antiferromagnetic element 26, which may be in the form of a rod, as shown.

Any suitable means, such as a winding 28 energized from a suitable source of direct current, may be provided for supplying a magnetic biasing field represented by the vector $H_{dc}$ to the element 26, the axis of which coincides with the longitudinal axis of the microwave cavity 25. The magnetic biasing field is represented by the vector $H_{dc}$. The element 26 may be fixedly supported centrally of the cavity 25 in any suitable manner with the magnetic field parallel to the unperturbed direction of the magnetic moments. A circular coupling iris 27 in the upper transverse wide face of waveguide section 20 couples this section to the cavity 25.

Figure 7:
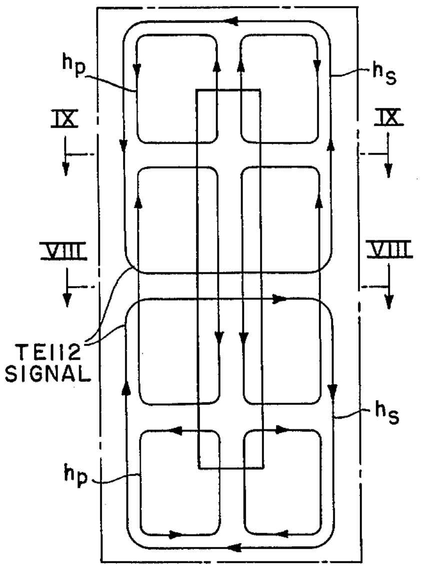
FIG. 7 is a skeletonized isometric view of the resonant cavity shown in FIG. 3 illustrating the preferred microwave resonant cavity modes.
Figure 9:
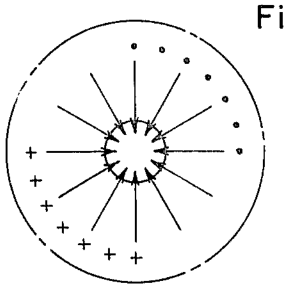
FIG. 9 is a sectional view on lines IX—IX of FIG. 7 and looking in the direction of the arrows.
Figure 10:
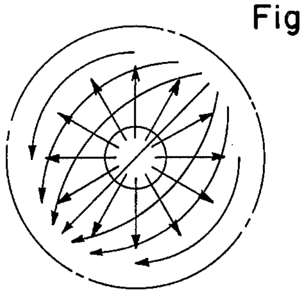
FIG. 10 is a top view of FIG. 7.

Referring to the previous discussion, the magnetic field in the antiferromagnetic rod 26 is a composite of the magnetic biasing field $H_{dc}$, the transverse alternating field $h_s$ produced by the signal voltage $V_s$ from the generator 21, the magnetic field $h_p$ produced by the microwave pump frequency $f_p$ supplied by the generator 23, together with the field $h_i$ of the idler frequency $f_i$ which is one of the natural resonant frequencies of the cavity 25. The field $h_p$ of the pump frequency is coupled from waveguide section 22 to the cavity 25 in suitable manner so that the pump field $h_p$ is supported on one of the $TE_{omn}$ modes of the cavity, for example, the $TE_{011}$ mode or preferably the $TE_{013}$ mode as illustrated in FIGS. 7 to 10, inclusive, of the cavity 25 so that it is parallel to the polarizing field $H_{dc}$. The signal frequency field $h_s$ is supported on one of the $TE_{11n}$ modes, preferably the $TE_{112}$ mode as illustrated in FIG. 7, of the cavity 25. The direct current magnetic biasing field $H_{dc}$ is properly adjusted to tune the resonances in accordance with Equation 8 so that one of the natural uniform precessional modes is substantially equal to that of the $TE_{013}$ mode of the cavity 25.

Figures 11, 12, 13, 14:
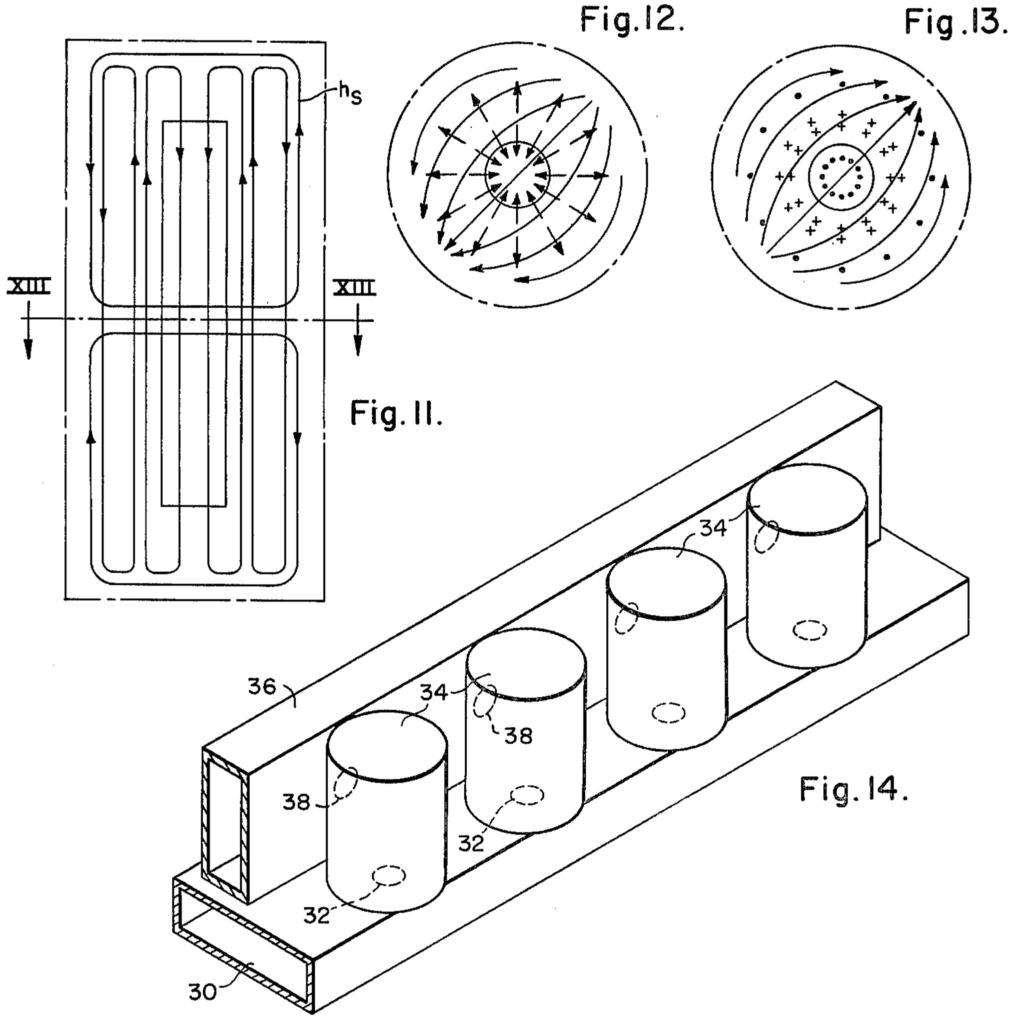
FIG. 11 illustrates another embodiment illustrating a second form of electromagnetic mode resonance in the coupling cavity of FIG. 3.
FIG. 12 is a top view of FIG. 11.
FIG. 13 is a sectional view of FIG. 11 on the lines XIII—XIII and looking in the direction of the arrows.
FIG. 14 is an extended form of the embodiment shown in FIG. 3 in which a plurality of the coupling units similar to that shown in FIG. 3 are arranged in cascade for the purpose of increasing the amplification gain.

In a second embodiment of the invention, as illustrated in FIGS. 11, 12 and 13 the pump frequency field $h_p$ is supported on the $TE_{021}$ mode of the cavity 25. Otherwise it is the same as the previous embodiment. In this instance the biasing magnetic field $H_{dc}$ would be adjusted to tune one of the natural uniform precessional mode resonances of the element 26 to the $TE_{021}$ mode of the cavity or wavelength structure 25.

The fields produced by the two oppositely directed and oppositely rotating precessional mode resonances characteristic of the antiferromagnetic materials, as previously mentioned, constitute the coupling between the signal frequency and the pump frequency fields.

Going back to the previous discussion it will be recalled that in the schematic representation of FIGURE 1, in which the gyromagnetic phenomena in antiferromagnetic material is illustrated by the representation of a gyroscope 10 symbolizing the electron associated with magnetic field components, the biasing field $H_{dc}$ is directed along the Z axis while the transverse magnetic components $M\omega_S\pm$ corresponds to the field resulting from the microwave frequency voltage of the signal frequency $f_s$ in the wave guide section 20. In each of the resonant modes the transverse components rotate about the Z axis under precession forces due to the magnetic moments $M_1$ and $M_2$ and the transverse components. The relation between the radian precessional frequency $\omega_e$ and the frequency of the microwave signal $f_s$ is shown by the equation $$\omega_p=\gamma(H_c\pm H_{dc})=2\pi f_s \tag{9}$$

where, $f_s$ is equal to the signal frequency.

Figure 4:
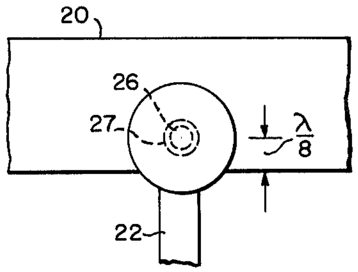
FIG. 4 is a partial sectional view taken on lines IV—IV of FIG. 3 and looking in the direction of the arrows.

The rotation of the transverse magnetic vectors $M\omega_s\pm$ is accomplished by the circular polarization effect of the coupling of the electromagnetic wave field through the coupling iris 27 as the electromagnetic wave proceeds down the wave guide section from the left to right as illustrated in FIGURE 4. It is of course apparent that in order for the present device to operate as an amplifier it is necessary that the coupling between the signal wave guide section 20 and the pump signal wave guide section 22 have a non-reciprocal characteristic. This is accomplished in general in the following manner: The antiferromagnetic rod 26 transfers power from the pump frequency guide section 22 to the signal wave guide section 20 by two mechanisms, namely, dielectric coupling and magnetic coupling. The incident wave in the wave guide 22 is assumed to be operating in the fundamental mode and produces an RF magnetic field which is parallel to the axis of the rod 26. A signal frequency wave is propagated down waveguide 20 from iris 27 and couples into cavity 25. This produces a circularly polarized transverse RF magnetic field in the rod 26 at frequency $\omega_s$.

In this combination, the rod 26 acts to couple energy from the pump circuit to the signal circuit by means of the nonlinear response of the antiferromagnetic material of rod 26 parallel to the natural direction of the magnetic moment, that is $$M_{zi}^2=M_i^2-M_{ti}^2 \tag{10}$$

where $M_i$ refers to the instantaneous values of either of the magnetic moments of the system and $M_{zi}$ and $M_{ti}$ are the instantaneous values of the magnetic moment components, respectively, parallel and transverse to $M_i$ in the presence of transverse excitation. Since $M_{ti} \ll M_i$ $$M_{zi}\approx M_i^2-\frac{1}{2}\frac{M_{ti}^2}{M_i} \tag{11}$$

The actual mechanism of energy transfer is the same as any other parametric amplifier which utilizes an amplitude squared nonlinear interaction. It can best be understood in terms of the gyrations of the interpenetrating magnetic moments of the electrons of antiferromagnetic material by referring to FIG. 1 and FIG. 17.

In the presence of the two oppositely rotating resonant magnet vectors, as shown in FIG. 1, the motion of one of the magnetic moments, say $M_1$, will, in general, be elliptical. It might be remarked here, as an aside, that equal responses of the two resonances which would lead to linear polarization occurs when $$H_{dc}=H_A \qquad (12)$$

From Equation 10 it is evident that as $M_t$ decreases $M_z$ increases and vice versa. Thus the frequency of the variation of the magnetic moments in the Z direction is just the sum of the frequencies of the oppositely rotating transverse resonant vectors. If an RF magnetic field such as the pump field $h_p$ is applied parallel to the Z axis, thereby modulating the applied field $H_{dc}$, and is phased so that it is positive when $M_z$ is increasing and negative when $M_z$ is decreasing energy will be imparted to the oscillating transverse mode vector. If the amplitude of RF field $h_p$ is sufficiently large that the amount of energy transfer is equal to the losses of the oscillating transverse mode, the oscillation will be sustained by the presence of $h_p$. This is parametric oscillation. By decreasing the amplitude of $h_p$ to just below the threshold of oscillation the transverse mode will not be excited except in the presence of a direct excitation of one of the transverse modes, say the signal mode $\omega_s$. In the presence of transverse excitation the amplitude of the signal mode will be much greater by virtue of the presence of $h_p$. The phase of the transverse mode rotating oppositely to the signal mode will adjust to that energy transfer occurring from the pump field vector $h_p$ to the transverse mode resonances.

Each of the magnetic moment vectors will respond in an analogous fashion and the total response of this antiferromagnetic system is the sum of these responses.

Figure 6:
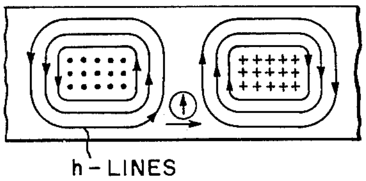
FIG. 6 is a partial horizontal sectional view on lines VI—VI of FIG. 3 and looking in the direction of the arrows.
Figure 8:
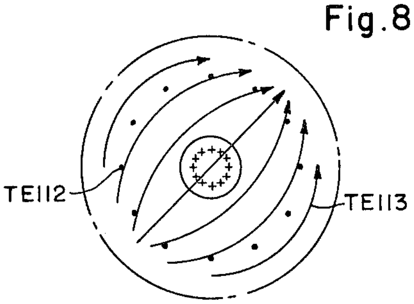
FIG. 8 is a cross sectional view on lines VIII—VIII of FIG. 7 and looking in the direction of the arrows.

Returning to the decription of the preferred embodiment of the present invention where the pump field is supported on the $TE_{013}$ mode of the cavity 25 while the signal voltage field is coupled with the circularly polarized $TE_{112}$ mode, the manner in which the coupling between the wave guide section 20 and the cavity 25 causes circular polarization of the signal frequency in the cavity will be seen from reference to FIGS. 3 and 4. In FIG. 4 it is to be noted that the coupling iris 27 is displaced to one side of the upper broad side of the wave guide section 20 so that the center of the iris is substantially at the point of circular polarization or approximately one eighth wave length from the side of the guide 20. Referring to FIG. 6, which illustrates the relation between the electric and magnetic vectors in the dominant mode in wave guide section 20, it will be noted that as the waves are propagated down the section 20 from left to right at a point approximately one eighth wave length from the edge that the magnetic vectors rotate around 360° per one wave length travel of the wave. This is a phenomena that is well known in the microwave guide art and will be readily understood. This causes the lines of magnetic force parallel to and adjacent to the inside surfaces of the cavity to rotate at the same time the magnetization of the post 26 rotates. In accordance with the general principles of the phenomena of operation in materials having two oppositely rotating natural precessions discussed above, energy from the pump frequency generator 23 is coupled to the signal wave to cause amplification thereof.

Figure 5:
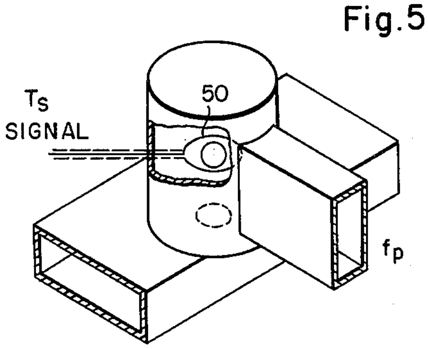
FIG. 5 shows an alternative form for coupling the signal to the cavity.

In the embodiment of the invention shown in FIG. 5, the pump field supported on one of the $TE_{omn}$ modes can be coupled with the signal voltage from coaxial loop 50 connected to a coaxial line 51 surrounding a sample of material 52.The idler field is then coupled to the oppositely rotating transverse resonance and need not be coupled to an external resonance when signal translation or amplification is required.

The embodiment shown in FIGS. 3, 4 and 6 could be extended to provide a cascade amplifier wherein several cavities, which together with the antiferromagnetic rods, similar to the rod 26, could be connected a tthe appropriate power points between the pump frequency and the signal frequency guide.

To this end, a signal guide section 30 is coupled through a plurality of circular irises 32 to resonant idler cavities 34, similar in general to cavity 25 which are in turn respectively connected to a wave guide section 36, the latter being connected to a source of pump frequency, not shown. It will be readily apparent that in order to accomplish the desired coupling between the signal section 30 and the pump frequency section 36 coupling must be provided between the sections and the cavities at the appropriate half wave power points. In order to accomplish this arrangement the cavities 34 are coupled to the broad side of the pump frequency guide 36 by means of circular irises 38. If the resonant cavities 34 are of the same size and the antiferromagnetic rods in each of these are tuned to the same magnetic resonance very high gain can be achieved. On the other hand, if these coupling units are stagger tuned a wide bandwidth may be achieved as desired.

It will be readily apparent to those skilled in the art that the present invention is not limited to the exact details illustrated and described and that various changes and modifications could be made without departing from the spirit thereof.

I claim as my invention:

1. A parametric amplifier comprising a first waveguide section adapted to receive and propagate a microwave local oscillator pump frequency signal, a second microwave guide section adapted to receive and propagate a signal frequency, an electromagnetic cavity resonant at the pump and signal frequencies, an element of material having two natural uniform precessional modes and no net external magnetic moment arranged in said cavity, one of said precessional modes corresponding to one of the resonant modes of said cavity, means for supplying a fixed magnetic biasing field parallel to the unperturbed direction of the magnetic moments of said material and means for coupling said cavity to said first and second microwave sections.

2. A parametric amplifier comprising a first microwave guide section adapted to receive and propagate a local oscillator pump frequency signal, a second microwave guide section adapted to receive and propagate an information signal, an electromagnetic cavity, resonant at the pump and signal frequencies an antiferromagnetic element supported coaxially within said cavity means for supplying a fixed magnetic bias field parallel to the unperturbed direction of the magnetic moments of said material and to the axis of said cavity, said first waveguide section being coupled to said cavity to excite a $TE_{omn}$ mode therein, said second waveguide section being coupled to said cavity to obtain a circularly polarized magnetic field in said cavity.

3. A parametric amplifier comprising a first wave guide section adapted to receive and propagate a signal frequency, a second wave guide section adapted to receive and propagate a local oscillator pump frequency, an electromagnetic cavity resonant at the pump and signal frequencies coupled between said first and second wave guide sections, an antiferromagnetic element in said cavity, the broad sides of said wave guide adapted to receive said pump frequency field being parallel to the axis of said cavity and being coupled to said cavity to excite the $TE_{11}$ mode therein, said cavity being coupled to the broad side of said information signal wave guide section at a point substantially a quarter wavelength from the center line of said wave section receiving said signal frequency and means for establishing a fixed magnetic biasing field parallel to the unperturbed direction of the magnetic moments of said material.

4. A parametric amplifier comprising a first wave guide section adapted to receive and propagate a signal frequency, a second wave guide section adapted to receive and propagate a local oscillator pump frequency, a plurality of cavities each resonant at the pump and signal frequencies coupled to said signal frequency section and said pump frequency section at points spaced by multiples of substantially a half wavelength, each of said cavities having disposed therein an element of material exhibiting more than one natural uniform precessional mode resonance when biased by an external magnetic field parallel to the unperturbed direction of moments of said material, and means for providing a fixed magnetic biasing field parallel to the longitudinal axis of each of said cavities, one of the natural precessional modes of said material corresponding in frequency to one of the resonant frequencies of said cavities.

5. A parametric amplifier comprising a first waveguide section adapted to receive and propagate a local oscillator pump frequency electromagnetic wave signal, a second waveguide section adapted to receive and propagate an information signal frequency electromagnetic wave, an electromagnetic cavity resonant at the pump and signal frequencies, an element of material having two natural uniform precessional mode resonances and no net external magnetic moment arranged coaxially in said cavity, and means for supplying a magnetic biasing field to said element to remove the degeneracy of said natural resonant modes, one of said precessional modes of said material corresponding to one of the resonant modes of said cavity.

6. A parametric amplifier comprising a first waveguide section adapted to receive and propagate a local oscillator pump frequency signal, a second waveguide section adapted to receive and propagate an information signal frequency, an electromagnetic cavity resonant at the pump and signal frequencies, an elongated element of material having two natural uniform precessional mode resonances and no natuarl magnetic moment arranged coaxially in said cavity, and means for providing magnetic biasing field parallel to the longitudinal axis of said element and to the unperturbed direction of the magnetic moments of said material of said element for removing the degeneracy of said natural precessional mode resonances and making one precessional mode resonance substantially equal to the frequency of said information signal.

7. A parametric amplifier comprising a first waveguide section adapted to receive and propagate a microwave local oscillator pump frequency signal wave, a second wave guide section adapted to receive and propagate an information signal frequency wave, an electromagnetic cavity resonant at the pump and signal frequencies coupled between said first and second waveguide sections, an element of material having two natural uniform precessional mode resonances and no net external magnetic moment and means for applying a magnetic field component parallel to the unperturbed direction of the magnetic moments of said material, said magnetic field component being of such intensity as to adjust the precessional frequency of one of said natural mode resonances so that it is substantially the same as that of the frequency of one of the resonant frequencies of said cavity.

8. A parametric amplifier comprising a first waveguide section adapted to receive and propagate a microwave local oscillator pump frequency signal wave, a second microwave guide section adapted to receive and propagate an information signal, an electromagnetic cavity resonant at the pump and signal frequencies operatively connected between said first and second waveguide sections resonant frequencies corresponding, respectively, to the pump and signal frequencies, an element of material having two natural uniform precessional modes resonances, one of which corresponds to one of the resonant frequencies of said cavity, said material having no net external magnetic moment, means for applying a magnetic biasing field embracing said element and parallel to the longitudinal axis of said cavity for removing the degeneracy of said resonant modes and adjusting the frequency of one of said natural precessional modes to a frequency substantially equal to one half that of the frequency of one of the resonant frequencies of said cavity.

9. A parametric amplifier comprising a resonant electromagnetic waveguide structure having resonant frequencies corresponding to the pump and signal frequencies means for coupling microwave energy at each of said frequencies to said waveguide structure, a sample of material having two natural uniform precessional mode resonances and no net external magnetic moment arranged in said waveguide structure so that it is coupled to the magnetic fields at both of said resonant frequencies in said waveguide structure, and means for establishing a magnetic biasing field through said sample of material to remove the degeneracy of said natural resonances and to adjust the frequency of one of said natural modes to substantially coincide with one of the resonant frequencies of said waveguide structure.

10. A parametric amplifier comprising a resonant electromagnetic waveguide structure having resonant frequencies corresponding to the pump and signal frequencies a sample of material having a pair of oppositely directed molecular magnetic moments and a corresponding pair of natural uniform precessional mode resonant frequencies and no net external magnetic moment operatively associated with said waveguide structure and adapted to be coupled to microwave energy fields existing in said waveguide structure, one of said precessional mode frequencies being substantially the same as that of one of said resonant frequencies of said resonant waveguide structure, means for coupling into said waveguide structure a microwave frequency excitation field parallel to the opposed molecular magnetic moments of said material, means for coupling into said microwave structure a circularly polarized electromagnetic wave field of substantially the same frequency as that of one of said resonant modes of said waveguide structure, said circularly polarized electromagnetic field having a component transverse to the direction of the molecular magnetic moments of said material, and means for applying a magnetic biasing field parallel to the unperturbed direction of the magnetic moments of said material to remove the degeneracy of said natural precession modes and to adjust one of said modes to a frequency substantially equal to the frequency of one of the resonant modes of said electromagnetic waveguide structure.

No references cited.

ROY LAKE, *Primary Examiner.*

D. HOSTETTER, *Assistant Examiner.*